United States Patent Office 3,103,697
Patented Sept. 17, 1963

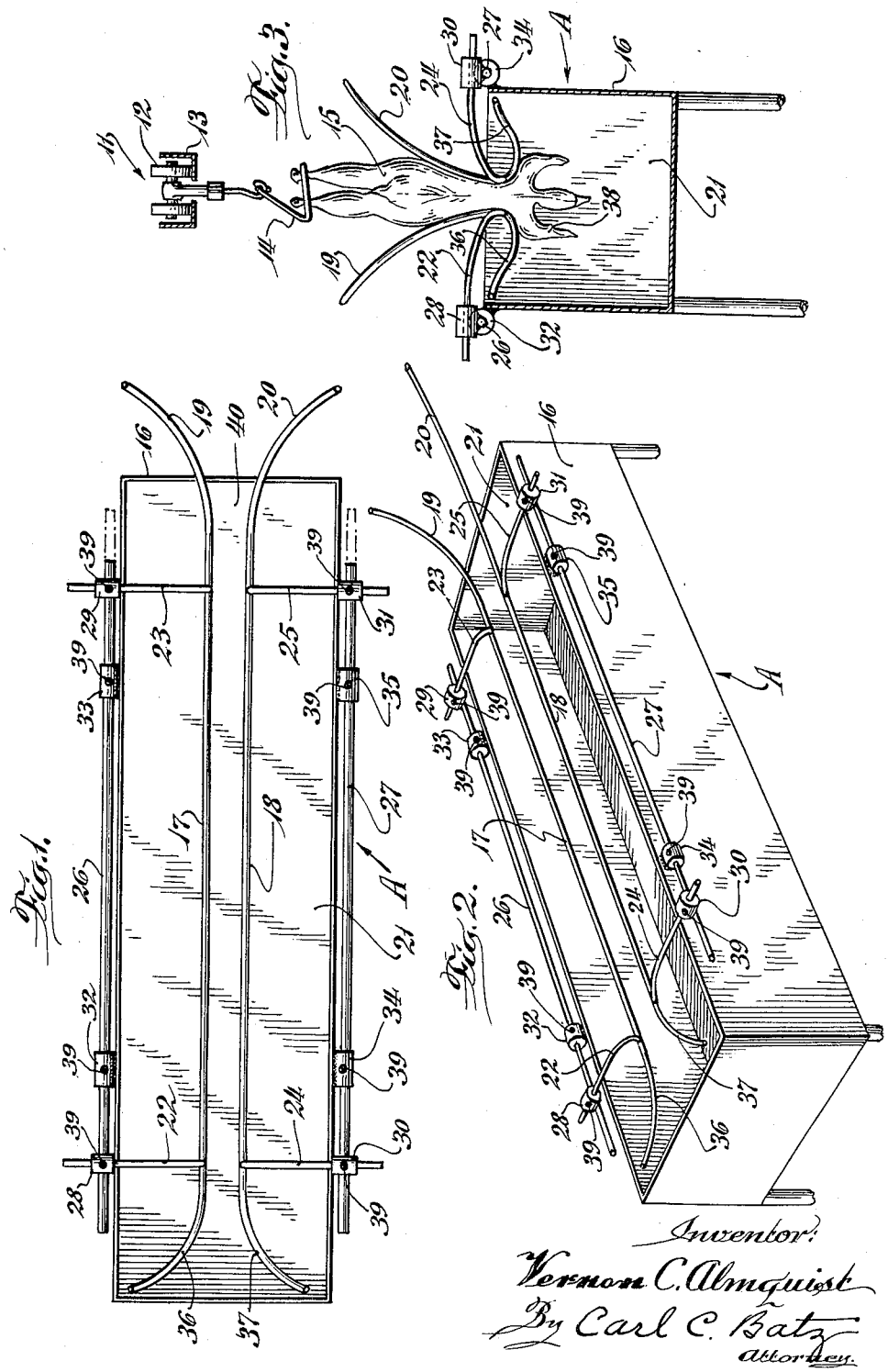

3,103,697
METHOD FOR TREATING POULTRY
Vernon C. Almquist, Western Springs, Ill., assignor, by mesne assignments, to Armour and Company, Chicago, Ill., a corporation of Delaware
Original application Oct. 1, 1958, Ser. No. 764,561, now Patent No. 3,041,658, dated July 3, 1962. Divided and this application May 9, 1962, Ser. No. 193,504
4 Claims. (Cl. 17—45)

This invention relates to a method and apparatus for treating poultry prior to the defeathering operation. More particularly, the invention provides an improved apparatus and method for multiple scalding which allows a more rapid and complete removal of feathers from the wings and necks of poultry.

This application is a division of application Serial Number 764,561, filed October 1, 1958 which is now Patent Number 3,041,658, issued July 3, 1962.

It has been customary, in commercial poultry picking or defeathering operations, to loosen the feathers prior to picking by immersing the poultry in hot water at a predetermined scalding temperature. The ease of feather removal is roughly proportional to the temperature of the water used; that is, the higher the water temperature, the easier it will be to remove feathers in the defeathering operation. But using water at high temperature has a drawback in that the mechanical pickers commonly used in commercial operations will "bark" or remove outer layers of skin of the poultry, thereby spoiling the appearance of the bird and making it easier for bacteria to enter the bird, contributing to a shorter shelf-life for the product. Also improved feeds and breeding techniques have permitted poultry growers to market birds having very tender meat, which makes it even less desirous to use water at the higher scalding temperatures. For these reasons it has been the practice to use water at a temperature which will not result in any appreciable skin damage when the birds are subjected to mechanical pickers. Using modern commercial picking machines, this practice has proved satisfactory in removing most of the feathers of poultry, yet a difficulty still remains in removing the feathers from the neck and wings. Because of the heavy feather covering on the wing area, higher temperature water can be employed to scald the wing portion without serious consequences.

In commercial operations, it is of course desired that the head, neck and wing scalding operation be practiced on a production line basis. However, when the birds are hung from their legs on a conveyor line and passed over a tank of scalding water, difficulty is encountered because of the fact that the birds vary in length. Some birds are so long that a portion of the breast passes through the hot water, resulting in "barking" of this area of the breast when subjected to the mechanical pickers. Then again, other birds are so short that portions of the wings do not pass through the hot water making it difficult to remove the feathers in the unscalded areas.

According to the preferred practice of the present invention, the poultry is first totally immersed in a water bath, the water being at a temperature which will not cause "barking" when the poultry is later subjected to mechanical pickers. Thereafter, the head, neck and wings of the bird are immersed in a second hot water bath having a substantially higher scalding temperature than the bath in which the entire bird was immersed. By using this method, feathers around the neck and those of the wings are additionally treated, and when the poultry is thereafter placed in automatic picking machines, all of the feathers will be quickly and easily removed, greatly minimizing the amount of additional treatment by hand.

Therefore, it is an object of this invention to provide a method and apparatus for scalding the head, neck and wing portions, only, of poultry, so as to efficiently loosen all feathers in this area, yet not damage the skin of other portions of the bird.

Another object of the invention is to provide a method and apparatus for scalding the head, neck and wing portions, only, of poultry of varying lengths, without the concommitant deleterious effects of scalding water to the skin of the breast of the poultry.

This invention will be more fully understood from the following description in connection with the accompanying drawings in which:

FIG. 1 is a plan view of the scalding tank illustrating one means for maintaining the head, neck and wings only, of poultry beneath the surface of the water.

FIG. 2 is a perspective view of the scalding tank structure.

FIG. 3 is an end elevational view of the device, showing a bird, suspended by its legs from an overhead conveyor, passing through the scalding tank structure.

In the drawings, the numeral 11 designates a conveyor system for transferring the bird on a production line basis, made up of trolleys 12 which ride on a track 13. The conveyor system is operated by a source of power not shown in the drawings. A detachable shackle 14 is used to secure the bird 15 to the conveyor system.

Following removal of the poultry from the total immersion tank, the poultry pass through the head-neck-wing scalder unit A. This unit is made up of a conventional scald tank 16, substantially parallel, spaced guide bars 17 and 18, having ends 19 and 20 flared outwardly and upwardly to allow the head, neck and wings of the bird to drop into the heated water 21. The guide bars are attached to supporting arms 22, 23, 24 and 25, which in turn are attached to the side bar supports 26 and 27 by means of couplings 28, 29, 30 and 31, welded to the side bar supports. The side bar supports are attached to the tank sides by means of couplings 32, 33, 34 and 35, which may be welded to the tank sides. At that end of the tank where the birds are to be removed from the hot water, the guide bars have outwardly flared end portions 36 and 37 to facilitate release of the wings 38 and for easy removal of the birds from the tank.

The couplings are provided with set screws 39 to adjust and hold the guide bars in any of a multitude of positions. It will be seen that if the tension on couplings 28, 29, 30 and 31, is released by opening the set screws, the distance between the guide bars can be varied. In a like manner vertical adjustment of the guide bars is obtained by opening the set screws on couplings 32, 33, 34 and 35, making the desired adjustment and thereafter tightening the set screws.

The guide bars, supporting arms, and side bars can be made, for example, from one half inch thin wall conduit or any other suitable material, the entire unit having such dimensions that it will fit the tank.

In operation, the individual birds suspended by their legs from the conveyor are first immersed in a conventional scald tank with a water temperature of 122°–126° F. for a period of 60 to 120 seconds. This scalding operation has been found sufficient to prepare most of the body feathers for the picking operation without any deleterious effect to the skin of the poultry. After being removed from this first scald, the birds proceed to the head-neck-wing scald unit. As the birds approach this scald unit, shown in the drawings, they move into engagement with the upwardly and outwardly flared end portions 19 and 20 of the guide bars 17 and 18. These flared end portions serve as means to align the bird into proper position between the guide bars and, because they are flared, provide an opening of greater dimension than that between the guide bars to allow the head, neck and wings of the bird to dip into the heated liquid.

When poultry are suspended in an inverted position, the natural tendency of the wings is to extend outwardly in a more or less horizontal plane with respect to the substantially vertically positioned body. Using my apparatus, the guide bars exert a force in the wing-pit area of the bird, causing the wings to assume a position almost parallel with the length of the body of the bird, thus assuring that the entire wing will come into contact with the heated liquid. The birds proceed through the head-neck-wing scald unit for a period ranging from 10 to 20 seconds, with a water temperature of from 140–145° F. The speed of the conveyor system should be so regulated that the birds will travel through the head-neck-wing scald unit for the desired period of time. The guide bars have outwardly flared end portions 36 and 37 at the outgoing end of the scald unit to provide for the release of the wings after the application of the selective scald. After the application of this selective scald, the birds pass onto a conventional mechanical picker wherein a plurality of flexible rubber picking fingers stroke the carcass to remove all the feathers.

In practice the height of this selective scald unit, with the guide bar assembly attached, is adjusted so that the unit (guide bars) will make contact in the wing-pit area of the smallest sized poultry being processed. Of course, when larger poultry are processed, adjustments of the guide bars may be made, yet this has been found to be usually unnecessary. Any tendency for the larger birds to sink deeper into the water is prevented by the guide bars, which support the main body of the poultry and prevent the breast area from making contact with the hot water, and at the same time exerting pressure on the wing-pit area of the birds so as to maintain the head, neck and wing portion beneath the surface of the liquid.

While in the foregoing specification various embodiments of this invention have been set forth and specific details thereof elaborated, it will be apparent that many changes and modifications may be made without departing from the spirit of the invention.

I claim:

1. A method of treating poultry comprising, suspending said poultry by its legs, passing the head-neck-wing portion of said poultry through a body of liquid while the poultry is so suspended, and exerting pressure on the wing-pit area of said poultry to maintain said head-neck-wing portion beneath the surface of said liquid during the passage of said portion through said liquid.

2. A method of treating poultry comprising, suspending said poultry by its legs, passing the head-neck-wing portion of said poultry through a body of heated liquid while the poultry is so suspended, and pressing downwardly on the wing-pit area of said poultry to maintain said head-neck-wing portion beneath the surface of said liquid during the passage of said portion through said liquid.

3. A method of treating poultry comprising, suspending said poultry by its legs, passing the head-neck-wing portion of said poultry through a body of heated liquid having a temperature within the range of 140° F.–145° F. while the poultry is so suspended, and pressing downwardly on the wing-pit area of said poultry to maintain said head-neck-wing portion beneath the surface of said liquid during the passage of said portion through said liquid.

4. A method of treating poultry comprising, suspending said poultry by its legs, passing the head-neck-wing portion of said poultry through a body of heated liquid having a temperature within the range of 140° F.–145° F., for a period of 10–20 seconds while the poultry is so suspended, and pressing downwardly on the wing-pit area of said poultry to maintain said head-neck-wing portion beneath the surface of said liquid during the passage of said portion through said liquid.

No references cited.